United States Patent
Chandrasekar et al.

(10) Patent No.: US 10,839,118 B1
(45) Date of Patent: Nov. 17, 2020

(54) OPTIMIZATION-AWARE INCREMENTAL SYNTHESIS

(71) Applicant: Xilinx, Inc., San Jose, CA (US)

(72) Inventors: Kameshwar Chandrasekar, Hyderabad (IN); Aman Gayasen, Hyderabad (IN); Manpreet Singh, Kalkaji (IN); Surya Pratik Saha, Hyderabad (IN); Sanjay Saha, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 14 days.

(21) Appl. No.: 16/204,512

(22) Filed: Nov. 29, 2018

(51) Int. Cl.
*G06F 30/327* (2020.01)
*G06F 30/392* (2020.01)
*G06F 111/04* (2020.01)

(52) U.S. Cl.
CPC .......... *G06F 30/327* (2020.01); *G06F 30/392* (2020.01); *G06F 2111/04* (2020.01)

(58) Field of Classification Search
CPC .... G06F 17/50; G06F 17/505; G06F 17/5072; G06F 17/5054; G06F 2217/78; G06F 30/327; G06F 2119/06; G06F 2119/12; G06F 30/34; G06F 30/392; G06F 2111/04; G06F 111/04
See application file for complete search history.

(56) References Cited

U.S. PATENT DOCUMENTS

| | | | | |
|---|---|---|---|---|
| 6,080,201 A | * | 6/2000 | Hojat | G06F 30/39 703/14 |
| 6,134,705 A | * | 10/2000 | Pedersen | G01R 31/3177 716/103 |
| 6,378,114 B1 | * | 4/2002 | Shenoy | G06F 30/392 716/105 |
| 10,346,573 B1 | * | 7/2019 | Sharma | G06F 30/39 |

OTHER PUBLICATIONS

Possignolo et al., "LiveSynthesis: Towards an Interactive Synthesis Flow", ICCAD, Nov. 16, 2016, pp. 1-7.*
Specification and drawings for U.S. Appl. No. 15/429,014, filed Feb. 9, 2017, Gayasen et al.
Specification and drawings for U.S. Appl. No. 15/927,846, filed Mar. 21, 2018, Chandrasekar et al.
Synopsys, "Synplify Pro and Premier" datasheet, 2015, pp. 1-3, Synopsys, Inc., Mountain View, California, USA.
(Continued)

*Primary Examiner* — Vuthe Siek
(74) *Attorney, Agent, or Firm* — Crawford Maunu PLLC

(57) ABSTRACT

A circuit design is partitioned into a plurality of partitions during a first synthesis by a computer processor. After modification of the circuit design, the computer processor determines changed partitions and unchanged partitions of the circuit design. The computer processor then determines dependent partitions of the changed partitions. The changed partitions and the dependent partitions are re-synthesized by the computer processor into respective re-synthesized partitions, and the computer processor then combines the respective re-synthesized partitions and the unchanged partitions into a complete synthesized circuit design in a memory.

17 Claims, 8 Drawing Sheets

(56) References Cited

OTHER PUBLICATIONS

Possignolo, Rafael Trapani et al., "LiveSynth: Towards an Interactive Synthesis Flow," Proc. of the 2017 54th ACM/EDA/IEEE Design Automation Conference, Jun. 18, 2017, pp. 1-6, IEEE, Piscataway, New Jersey, USA.

Chen, Doris et al., "Line-level Incremental reSynthesis Techniques for FPGAs," Proc. of the 19th ACM/SIGDA International Symposium on Field Programmable Gate Arrays, Feb. 27, 2011, pp. 133-142, ACM, New York, New York, USA.

Xilinx, "Vivado Design Suite User Guide," UG905 (v2017.2), Jun. 7, 2017, pp. 1-24, Xilinx, Inc., San Jose, California, USA.

* cited by examiner

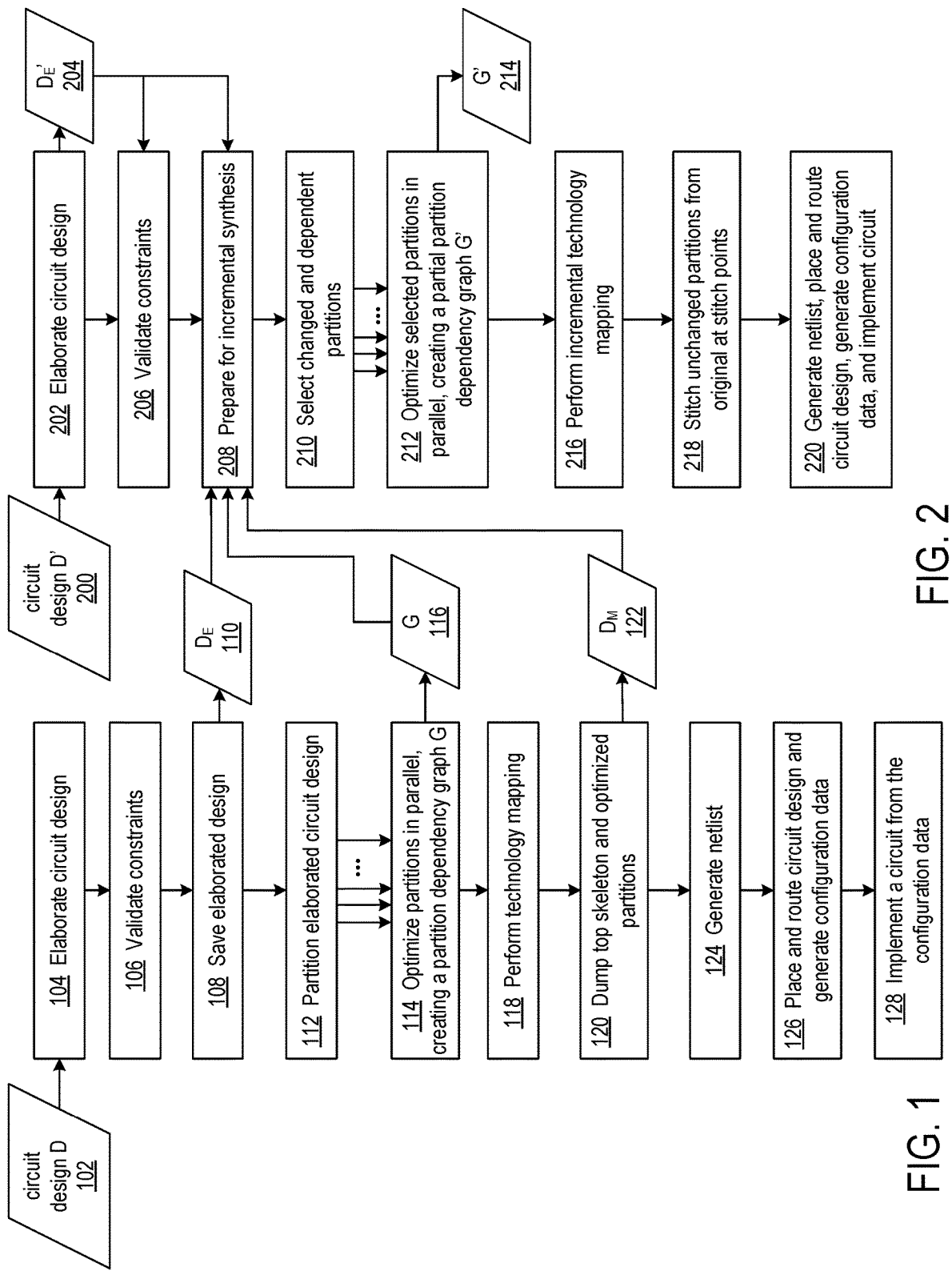

US 10,839,118 B1

OPTIMIZATION-AWARE INCREMENTAL SYNTHESIS

TECHNICAL FIELD

The disclosure generally relates to incremental synthesis.

BACKGROUND

When an incremental change is made to a circuit design, such as a small change made to register transfer language (RTL) code, current electronic design automation (EDA) tools resynthesize the entire circuit design or require a user to partition the design into changed partitions and unchanged partitions, and then resynthesize the changed partitions. In resynthesizing the changed partitions, the user can identify functionally invariant nodes to expand the changed partitions for re-synthesis or restrict cross-boundary optimizations across partitions.

Resynthesizing an entire circuit design can consume a significant amount of time to implement small changes. In addition, the quality of result (QoR) in terms of area, speed, and/or power consumption may be adversely affected due to sensitivity of optimization algorithms to even small changes.

Resynthesizing only changed partitions of a circuit design can also be problematic. Requiring a user to specify changed and unchanged partitions may be time-consuming and error prone. Disabling cross-partition optimizations during re-synthesis may limit the QoR. The effectiveness of identification of functional invariant nodes depends on finding invariant nodes proximate the change and tracking which nodes are invariant.

SUMMARY

According to one or more disclosed methods a computer processor partitions a circuit design into a plurality of partitions during a first synthesis. After modification of the circuit design, the computer processor determines changed partitions and unchanged partitions of the circuit design. The computer processor then determines dependent partitions of the changed partitions. The changed partitions and the dependent partitions are re-synthesized by the computer processor into respective re-synthesized partitions, and the computer processor then combines the respective re-synthesized partitions and the unchanged partitions into a complete synthesized circuit design in a memory.

According to other disclosed methods, during the first synthesis, the computer processor generates a partition dependency graph of the circuit design in a memory. The partition dependency graph specifies optimization dependencies between partitions and may be used in determining dependent partitions of the changed partitions A disclosed system includes a computer processor and a memory coupled to the computer processor. The memory is configured with instructions that when executed cause the computer processor to partition a circuit design into a plurality of partitions during a first synthesis. The instructions further cause the computer processor to determine after a modification of the circuit design, changed partitions and unchanged partitions of the circuit design. The computer processor in executing the instructions determines dependent partitions of the changed partitions and re-synthesizes the changed partitions and the dependent partitions into respective re-synthesized partitions. The computer processor in executing the instructions combines the respective re-synthesized partitions and the unchanged partitions into a complete synthesized circuit design.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 1 shows an exemplary process of initially synthesizing a circuit design in accordance with various implementations;

FIG. 2 shows a flowchart of a process for incrementally re-synthesizing portions of a circuit design through use of a partition dependency graph to determine partitions that should be re-synthesized because of optimizations to changed partitions;

DETAILED DESCRIPTION

Figure 3:
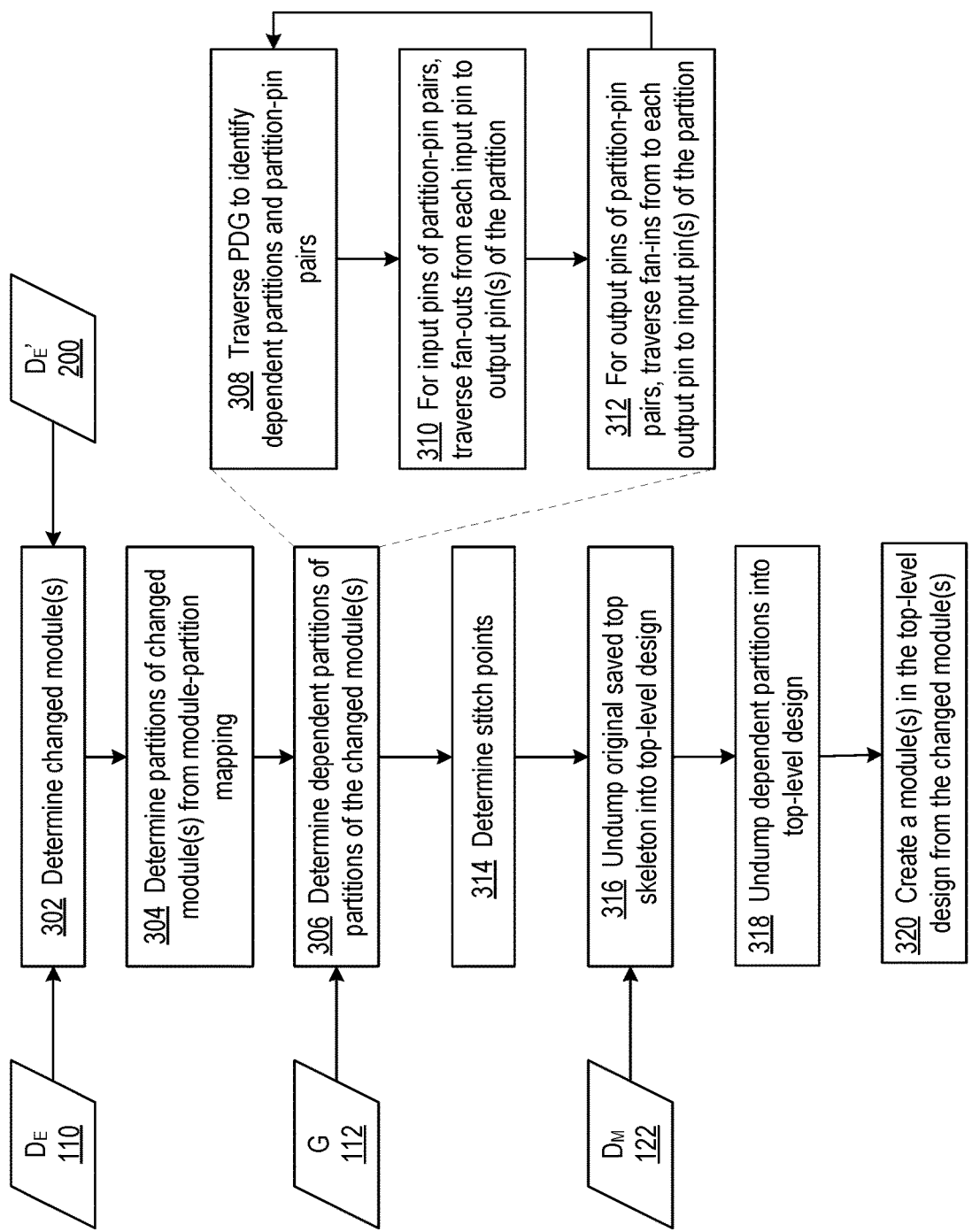
FIG. 3 shows a flowchart of a process performed by an EDA tool in preparing for incremental synthesis.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

FIG. 1 shows an exemplary process of initially synthesizing a circuit design in accordance with various implementations. A circuit design D 102 is input to an EDA tool, and at block 104, the EDA tool elaborates the circuit design. Elaboration expands a hardware description language (HDL) description to a representation having unique objects corresponding to all instances of design elements such as Verilog modules or Very high speed integrated circuits HDL (VHDL) entities. Elaboration also entails evaluation and propagation of ports, constants and Verilog parameters or VHDL Generics.

At block 106, the EDA tool validates constraints of the circuit design, such as through static power, timing, and area analysis, and at block 108 saves the elaborated circuit design $D_E$ as shown by block 110. The EDA tool partitions the circuit design at block 112. Each partition includes a portion of the logic of the circuit design, and the partitions are constructed such that optimizations of the partitions can be performed in parallel at block 114. In partitioning the circuit design, the EDA tool creates a mapping of modules of the elaborated circuit design $D_E$ to the partitions. The mapping is used subsequently in incremental re-synthesis to identify changed and unchanged partitions.

The optimizations performed by the EDA tool at block 114 can include area and timing optimizations. As the circuit design is undergoing optimization, the EDA tool at block 114 creates a partition dependency graph, denoted by G, and shown as block 116. The partition dependency graph is used in subsequent incremental re-synthesis of a modified circuit design D' and can be represented by a data structure in the memory of a computer system.

The partition dependency graph G includes vertices and edges. Each vertex represents a partition-pin pair, and each edge from one vertex to another vertex represents an optimization that was applied from the pin of the partition of one partition-pin pair to the pin in another partition in another partition-pin pair. The partition of a partition-pin pair is an identifier of one of the partitions created at block 112, and the pin of a partition-pin pair is an identifier of one of the pins at the boundary of the associated partition. Vertices having the same partition identifier are not connected by an edge.

The EDA tool creates vertices and edges for all synthesis optimizations made at the boundaries of the partitions. Examples of optimizations include, but are not limited to: constant propagation of logic 0 or logic 1 across partitions; equivalence on pins such as input pins driven by same driver and output pins connected to same load; in-out pins that are shorted; don't care signals indicated by dangling loads or drivers; don't touch signals such as interface values used inside partitions, re-extraction partitions resulting from re-partitioning on timing critical paths; and dissolved partitions which are partitions that are eliminated during optimization.

At block 118, the EDA tool maps logic elements of the optimized circuit design to a circuit elements of a target technology. For example, the EDA tool determines which circuit elements or combinations thereof of a field programmable gate array (FPGA) or particular application specific integrated circuit (ASIC) technology can implement the logic elements. The EDA tool associates the logic elements with the selected circuit elements.

The EDA tool at block 120 dumps the top skeleton and optimized partitions. The dumped design information, $D_M$ is shown as block 122. The top skeleton is a data structure, e.g., a file that specifies the hierarchy of module instances and partitions forming circuit design $D_E$ 110. While the top skeleton specifies the hierarchy of the circuit design, the partitions are empty, e.g., have no content. In this sense, the top skeleton is a "black-boxing" of circuit design $D_E$ 110 in which partitions are effectively empty containers that have input(s) and/or output(s).

The top skeleton $D_M$ can be subsequently used in an incremental synthesis process in merging re-synthesized partitions with unchanged partitions. At block 124, the EDA tool generates a netlist from the mapped circuit design.

At block 126, the EDA tool places and routes the netlist on a target integrated circuit (IC) device, such as an FPGA or ASIC. The EDA tool also generates configuration data, which can be suitable for programming a programmable IC or for fabricating an ASIC. At block 128, a circuit is implemented from the configuration data, such as by configuring a programmable IC with the configuration data or fabricating, making, or producing an ASIC from the configuration data, thereby creating a circuit that operates according to the resulting circuit design.

FIG. 2 shows a flowchart of a process for incrementally re-synthesizing portions of a circuit design through use of a partition dependency graph to determine partitions that should be re-synthesized because of optimizations to changed partitions. A changed circuit design D' is input to an EDA tool as shown by block 200, and the EDA tool elaborates the changed circuit design at block 202, producing elaborated, changed circuit design $D_E'$, which is shown as block 204. At block 206, the EDA tool validates constraints of the modified circuit design.

The EDA tool prepares for incremental synthesis at block 208. The EDA tool inputs the elaborated circuit design $D_E$ and modified, elaborated circuit design $D_E'$ to determine which modules have changed and require re-synthesis. The partition dependency graph G is used to determine additional partitions ("dependent partitions") to re-synthesize due to optimizations that cover pins in changed partitions and extend to pins in unchanged partitions. The top skeleton $D_M$ 122 and saved unchanged partitions are used in combining re-synthesized partitions with unchanged partitions.

At block 210, the EDA tool selects the changed partitions and dependent partitions and initiates optimization of the selected partitions at block 212. In optimizing the selected partitions, the EDA tool generates a modified partition dependency graph G', which is shown as block 214, as optimization dependencies may change due to the changes to the design. The EDA tool performs technology mapping of the optimized partitions and generates an incremental netlist at block 216.

At block 218, the EDA tool stitches together the unchanged partitions from the initial synthesis into the top-level design. In one implementation, the unchanged partitions are part of an original saved reference design, and EDA tool replaces the original partitions with the re-synthesized partitions to produce a new circuit design. In an alternative implementation, a new circuit design is created based on the top skeleton $D_M$ 122, the re-synthesized partitions are instantiated in the new circuit design, and the unchanged partitions are copied into the new circuit design.

At block 220, the EDA tool generates a netlist, places and routes the netlist, generates configuration data, and implements a circuit as described for blocks 124, 126, and 128 of FIG. 1.

FIG. 3 shows a flowchart of a process performed by an EDA tool in preparing for incremental synthesis, which is shown in context as block 208 in FIG. 2. The EDA tool at block 302 inputs the elaborated circuit design $D_E$ 110 and modified, elaborated circuit design $D_E'$ 200 to determine which modules have changed and require re-synthesis.

Once the changed modules are identified, the EDA tool at block 304 determines which partitions ("changed partitions") contain the changed modules. The mapping of partitions to modules, which was generated during the initial synthesis of the circuit design (FIG. 1) can be used to identify the partitions. A changed module can span one or more partitions, or a partition can cover multiple modules. Also, the EDA tool determines pins of changed partitions that are structurally connected to the pins of the changed modules by tracing fan-in signals of output pins of a changed module to input pin(s) of the partition and by tracing fan-out signals of input pins of a changed module to output pin(s) of the partition.

At block 306, the EDA tool uses the partition dependency graph G to determine additional partitions ("dependent partitions") to re-synthesize due to optimizations that cover the pins in changed partitions as identified at block 304 and pins in unchanged partitions. Determining dependent partitions is further detailed by blocks 308, 310, and 312. At block 308, the EDA tool traverses the partition dependency graph and identifies unchanged partitions having pins connected to pins of changed partitions. The identified partitions can be tagged as dependent partitions to be re-synthesized during incremental synthesis. The partition-pin pairs found in the traversal serve as starting points for determining additional dependent partitions.

The EDA tool at blocks 310 and 312 determines pins of dependent partitions that are structurally reachable from pins of the partition-pin pairs identified at block 308. For pins of partition-pin pairs that are input pins of a partition, at block 310 the EDA tool traverses the fan-out of each pin to structurally reachable output pin(s) of that partition using the netlist of the elaborated circuit design $D_E$ 110. Pins that are structurally reachable are determined from the netlist by tracing a signal at an input pin as the signal fans out from logic and tracing signals through registers to pins that are output pins of the partition. For pins of partition-pin pairs that are output pins of a partition, at block 312 the EDA tool traverses the fan-in of each output pin to structurally reachable input pin(s) of that partition using the netlist of the elaborated circuit design $D_E$. Pins that are structurally reachable are determined from the netlist by tracing a signal from the output pin as the signal fans-in from logic and tracing signals through registers to pins that are input pins of the partition.

The output pin(s) determined at block 310 and the input pin(s) determined at block 312 can be used by the EDA tool to identify further dependent partitions and partition-pin pairs at block 308. The processing of blocks 308, 310, and 312 can be repeated until no additional dependent partitions are found.

At block 314, the EDA tool determines changed and unchanged stitch points. Stitch points are module instance hierarchies that are persistent throughout synthesis (e.g., FIG. 6). If a sub-module of a module has changed, then the stitch point between the parent module and the sub-module is referred to as a changed stitch point. Unchanged stitch points refer to module instance hierarchies in which no changes have been made to those module and sub-module instances in the hierarchies. The stitch points indicate the connections in the circuit design at which the re-synthesized/unchanged partitions can be copied into the circuit design. The delineation between changed stitch points and unchanged stitch points is dynamic in that partition boundaries can change as a result of incremental synthesis and optimization. The dynamic approach by which changed and unchanged stitch points are identified expands incremental synthesis beyond user-defined structural stitch points, thereby significantly reducing the portions of the circuit design to be resynthesized.

The EDA tool, in stitching the re-synthesized partitions to the unchanged partitions at block 218 (FIG. 2), stitches either the re-synthesized partitions to a top-level design containing unchanged partitions, or stitches unchanged partitions to a top-level design containing the re-synthesized partitions, depending on the target of the stitching. The stitching involves copying re-synthesized partitions from the incremental synthesis run to the original circuit design, or the unchanged partitions to the incremental circuit design.

The EDA tool at block 316 un-dumps the original saved top skeleton into a top-level design. That is, the EDA tool reads back the skeleton, which was saved during the initial synthesis run, into a data structure in memory that represents the top-level design.

At block 318, the EDA tool un-dumps the dependent partitions into the top-level design. At block 320, the EDA tool creates a module in the top-level design for each changed module determined at block 302.

Figure 4:
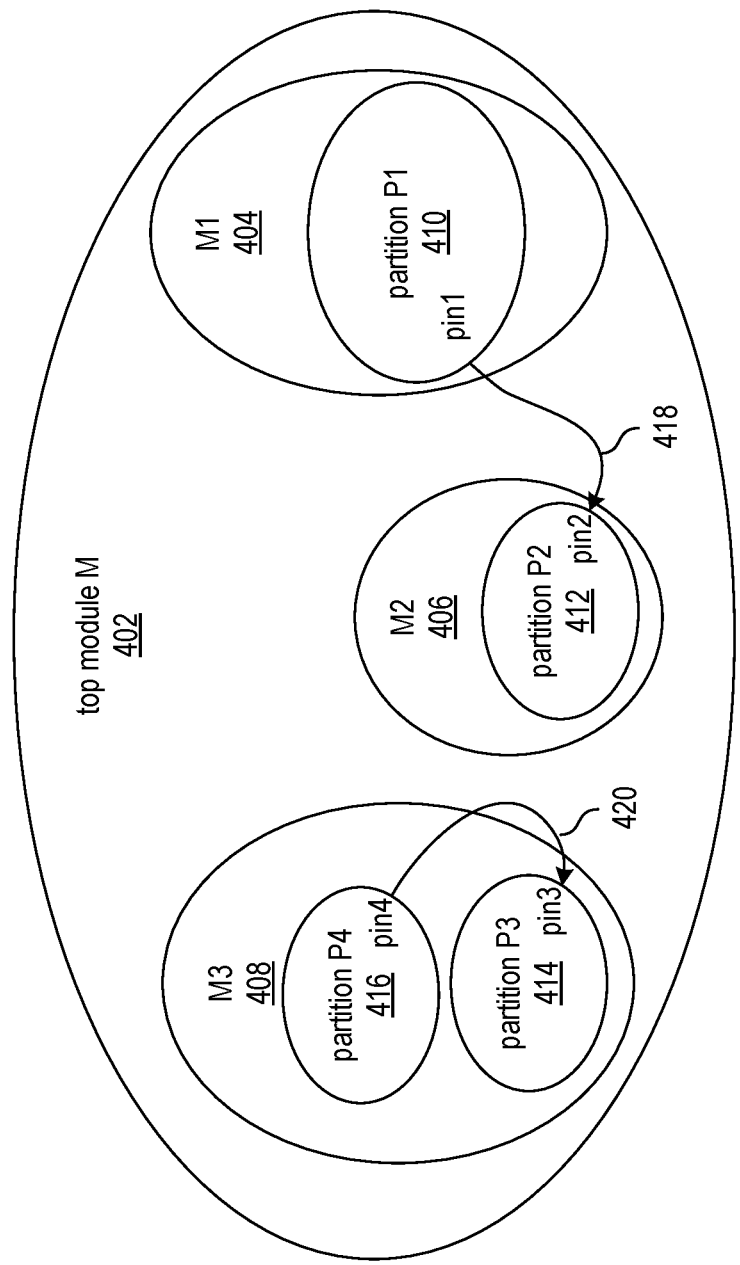
FIG. 4 shows a partition dependency graph from an initial synthesis of a circuit design.

FIG. 4 shows a partition dependency graph from an initial synthesis of a circuit design, and 5 shows the incremental partition dependency graph generated from incremental synthesis. FIG. 4 shows a partial partition dependency graph in relation to an exemplary circuit design having a top module M 402, which includes submodules M1 404, M2 406, and M3 408. Partition P1 410 is part of module M1, partition P2 412 is part of module M2, and partitions P3 414 and P4 416 are part of module M3. In optimizing the circuit design, one optimization by the EDA tool involves a signal path leading from pin1 of partition P1 to pin2 of partition P2. As a result of the optimization, the EDA tool generates an edge 418 in the partition dependency graph. Another optimization, involves a signal path leading from pin4 of partition P4 to pin 3 of partition P3, and the EDA tool generates and edge 420 in the partition dependency graph.

Figure 5:
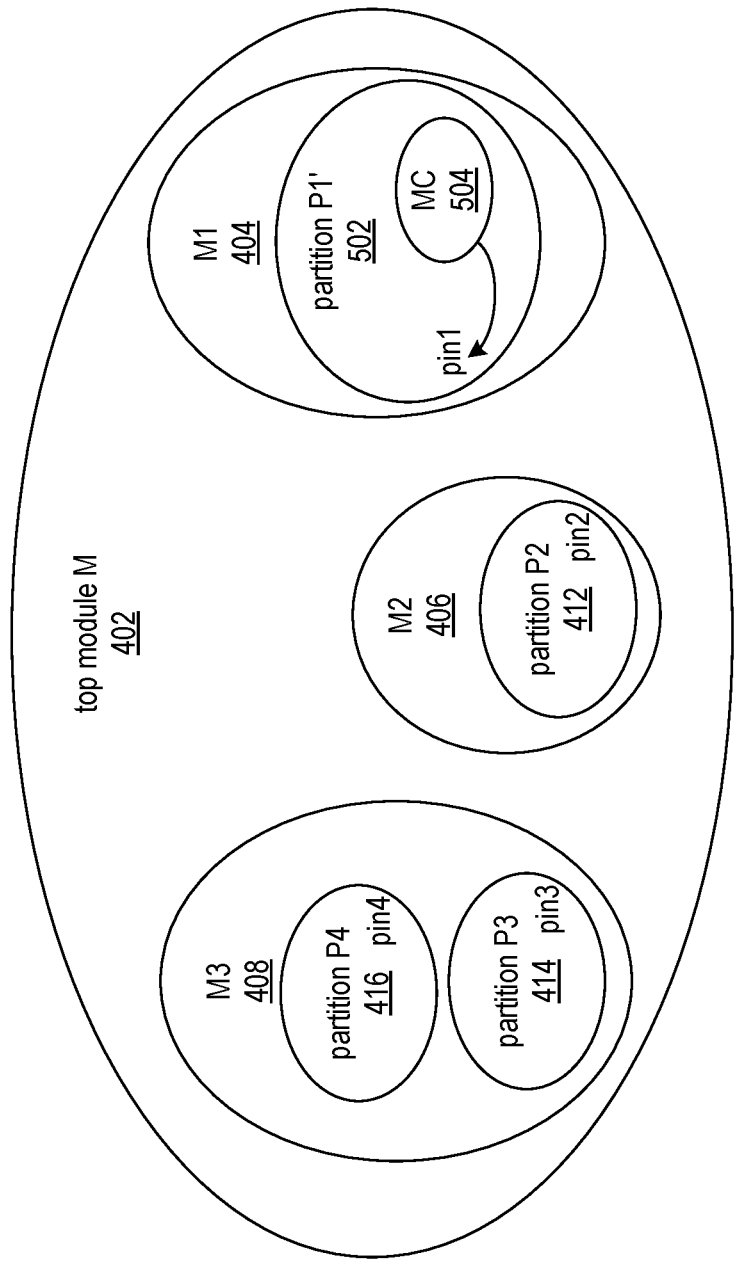
FIG. 5 shows the incremental partition dependency graph generated from incremental synthesis.

A portion of module M1 is changed and shown as changed portion MC 504 in FIG. 5. Since MC has a structural path to pin1, the EDA assumes that optimizations to MC affect pin1. Because pin1 might be affected by optimizations to MC, the EDA tool traverses the partition dependency graph of FIG. 4 from P1-pin1 to P2-pin2 and determines that P2 is a dependent partition. Thus, incremental synthesis will re-synthesize partitions P1 and P2, but not P3 and not P4. Partitions P3 and P4 are reused but not re-synthesized.

Figure 6:
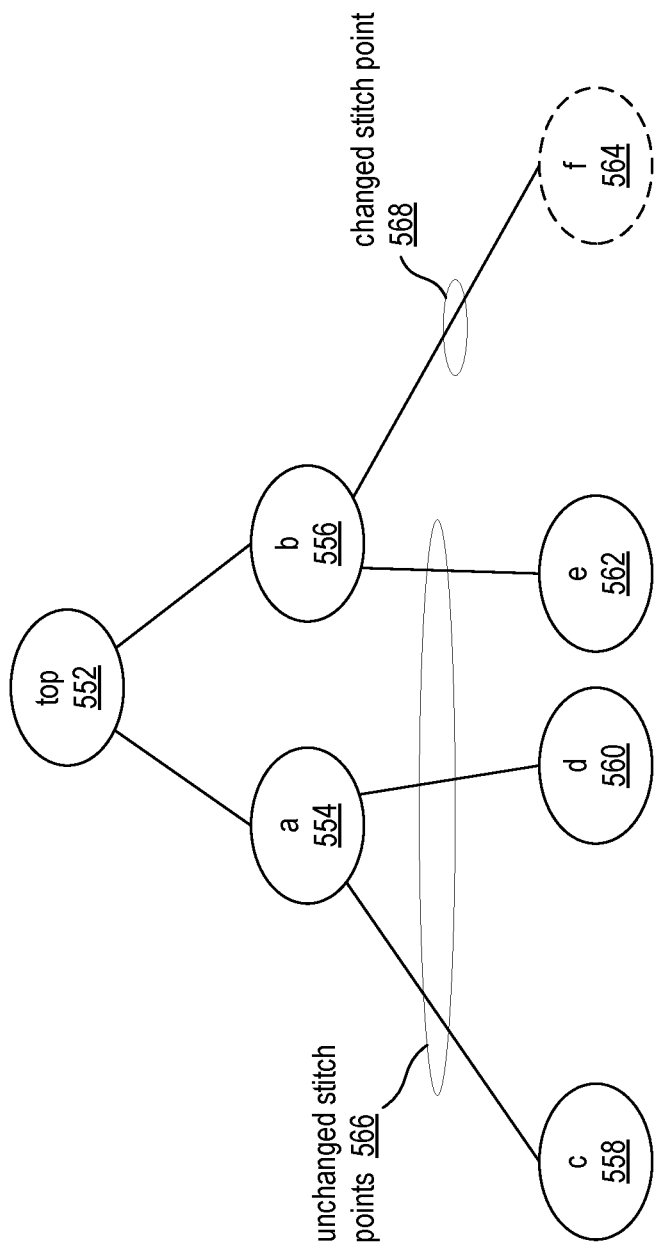
FIG. 6 shows a module instance hierarchy of an exemplary circuit design.

FIG. 6 shows a module instance hierarchy of an exemplary circuit design. The top-level module instance 552 has an instance 554 of module a and an instance 556 of module b. Module a has an instance 558 of module c and an instance 560 of module d, and module b has an instance 562 of module e and an instance 564 of module f.

"Stitch points" are represented by edges in the module instance hierarchy. If a module has a change or the module is within a dependent partition, then the edge from parent module to the changed module is a changed stitch point. If a module has not changed and is not within a dependent partition, then the edge from the parent to unchanged module is an unchanged stitch point.

Module f is a changed module as indicated by the dashed line of the instance 564. Modules c, d, and e have not changed. The changed stitch point is shown as edge 568, and the unchanged stitch points are shown as edges 566.

Figure 7:
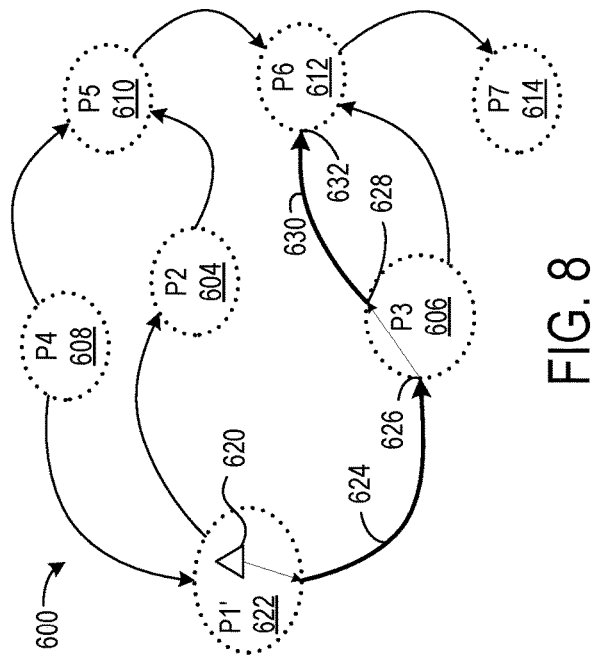
FIG. 7 shows the partition dependency graph from an initial synthesis run.
Figure 8:
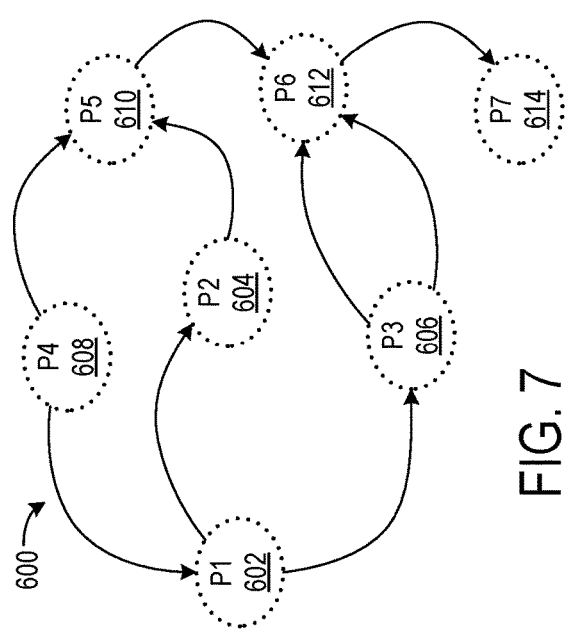
FIG. 8 Illustrates a traversal of partition dependency graph and an intra-partition traversal in an incremental synthesis run.
Figure 9:
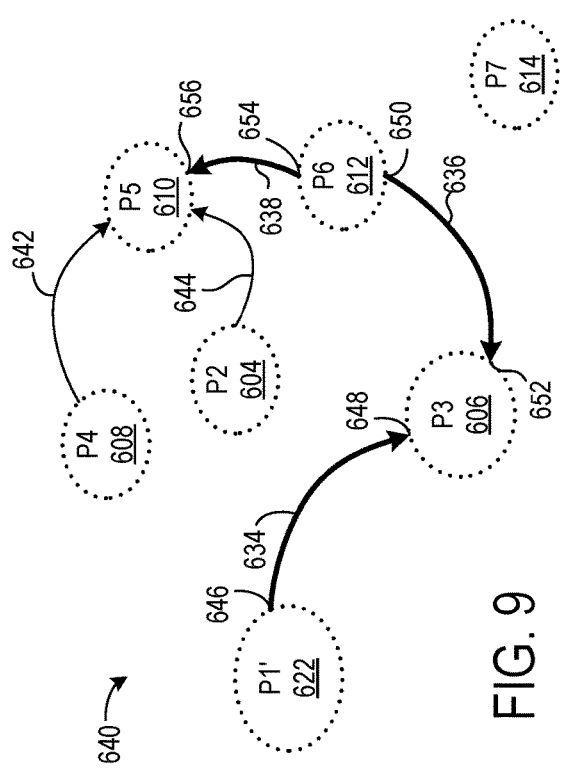
FIG. 9 shows the partition dependency graph that results from an incremental synthesis run on the exemplary modified circuit design.

FIGS. 7, 8, and 9 show a sequence in which a partition dependency graph changes from an initial synthesis run and is used and modified in an incremental synthesis run. FIG. 7 shows the partition dependency graph, $PDG_R$, 600 from an initial synthesis run (or "reference synthesis run"). The circuit design includes partitions P1-P7, which are shown as dotted circles 602, 604, 606, 608, 610, 612, and 614. The dots represent pins of the partitions, and the edges represent the optimization dependencies.

FIG. 8 Illustrates a traversal of $PDG_R$ 600 and an intra-partition traversal in an incremental synthesis run. Module 620 is a changed module within changed partition P1' 622. Partitions P3 and P6 are determined to be dependent partitions. The changed module is structurally linked to a pin of partition P1' 622, for which an optimization involves a pin of partition P3, as shown by edge 624. Thus, partition P3 606 is a dependent partition and will be re-synthesized along with partition P1'. Also, a signal path can be traced from the input pin 626 to the output pin 628 of P3, and edge 630 connects output pin 628 of partition P3 to input pin 632 of partition P6 612. Thus, partition P6 is also a dependent partition to be re-synthesized in incremental synthesis.

FIG. 9 shows the PDG 640 that results from an incremental synthesis run on the exemplary modified circuit design. In constructing PDG 640 during incremental synthesis and optimization of the changed and dependent partitions, the EDA tool removes from the previous PDG (in this example the reference PDG, $PDG_R$), all edges connected to input pins of a changed partition or a dependent partition, and all edges connected to output pins of a changed partition or a dependent partition are removed from the partition dependency graph. In the example, only edges 642 and 644 remain from $PDG_R$ 600 (FIG. 7).

In response to optimization of the changed partitions and dependent partitions P1', P3, and P6, new optimization dependencies are identified and represented in PDG 640. New pin-to-pin edges 634, 636, 638 are created in response to optimization processes performed during incremental optimization. Edge 634 represents an optimization dependency between pin 646 of partition P1' and pin 648 of partition P3; edge 636 represents an optimization dependency between pin 650 of partition P6 and pin 652 of partition P3; and edge 638 represents an optimization dependency between pin 654 of partition P6 and pin 656 of partition P5. The PDG of FIG. 9 can be used as the PDG for a subsequent incremental synthesis run.

The disclosed methods and system reduce the time required to perform incremental synthesis and thereby improve performance of the computer system hosting the EDA tool. A test suite including 232 circuit designs was run through incremental synthesis employing the disclosed approaches. Incremental synthesis of larger designs showed more improvement in performance than incremental synthesis of smaller designs. For the largest circuit design, run-time performance improvement of approximately 2× was observed as compared to prior approaches. Thus, incremental synthesis time can be reduced by half. Also, testing revealed that the disclosed approaches to incremental synthesis do not increase circuit area requirements of the resulting netlist.

Figure 10:
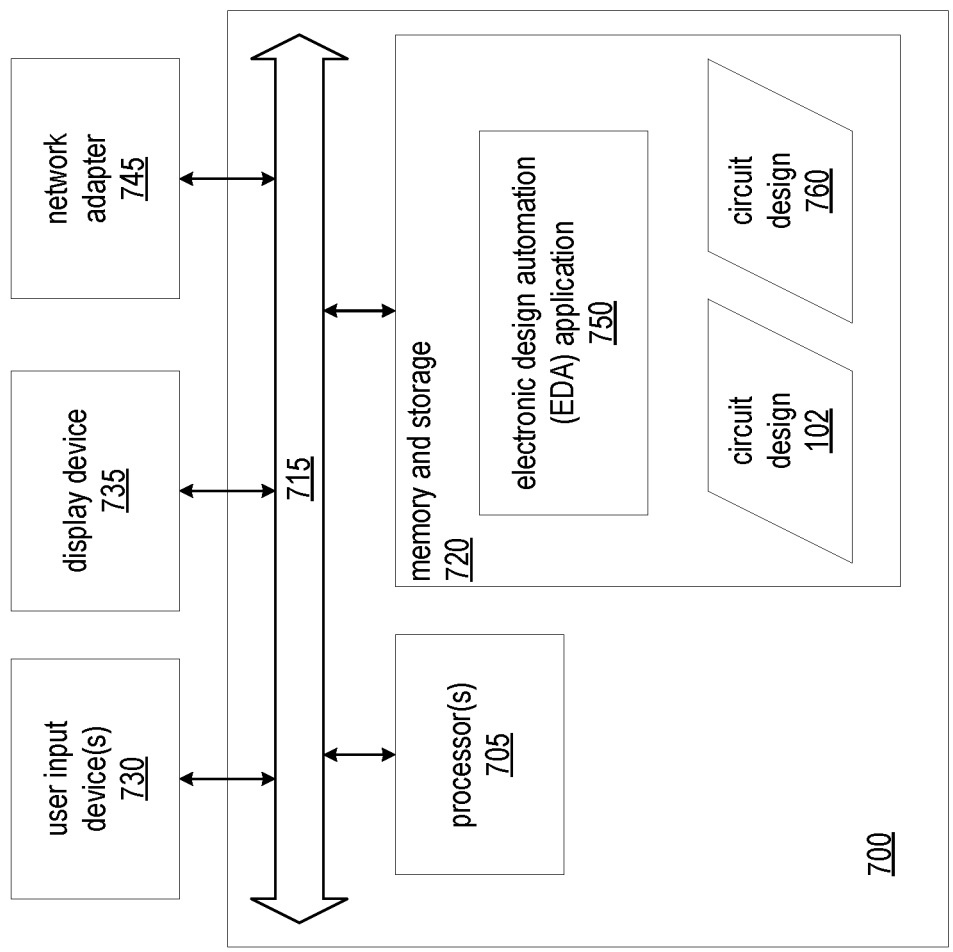
FIG. 10 is a block diagram illustrating an exemplary data processing system.

FIG. 10 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 102 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 102. In one aspect, system 700 performs a design flow on circuit design 102, and the design flow may include synthesis, mapping, placement, routing, and incremental synthesis as described herein. System 700 generates an optimized, or modified, version of circuit design 102 as circuit design 760, which can include configuration data for fabricating an ASIC or configuring a programmable IC.

EDA application 750, circuit design 102, circuit design 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Figure 11:
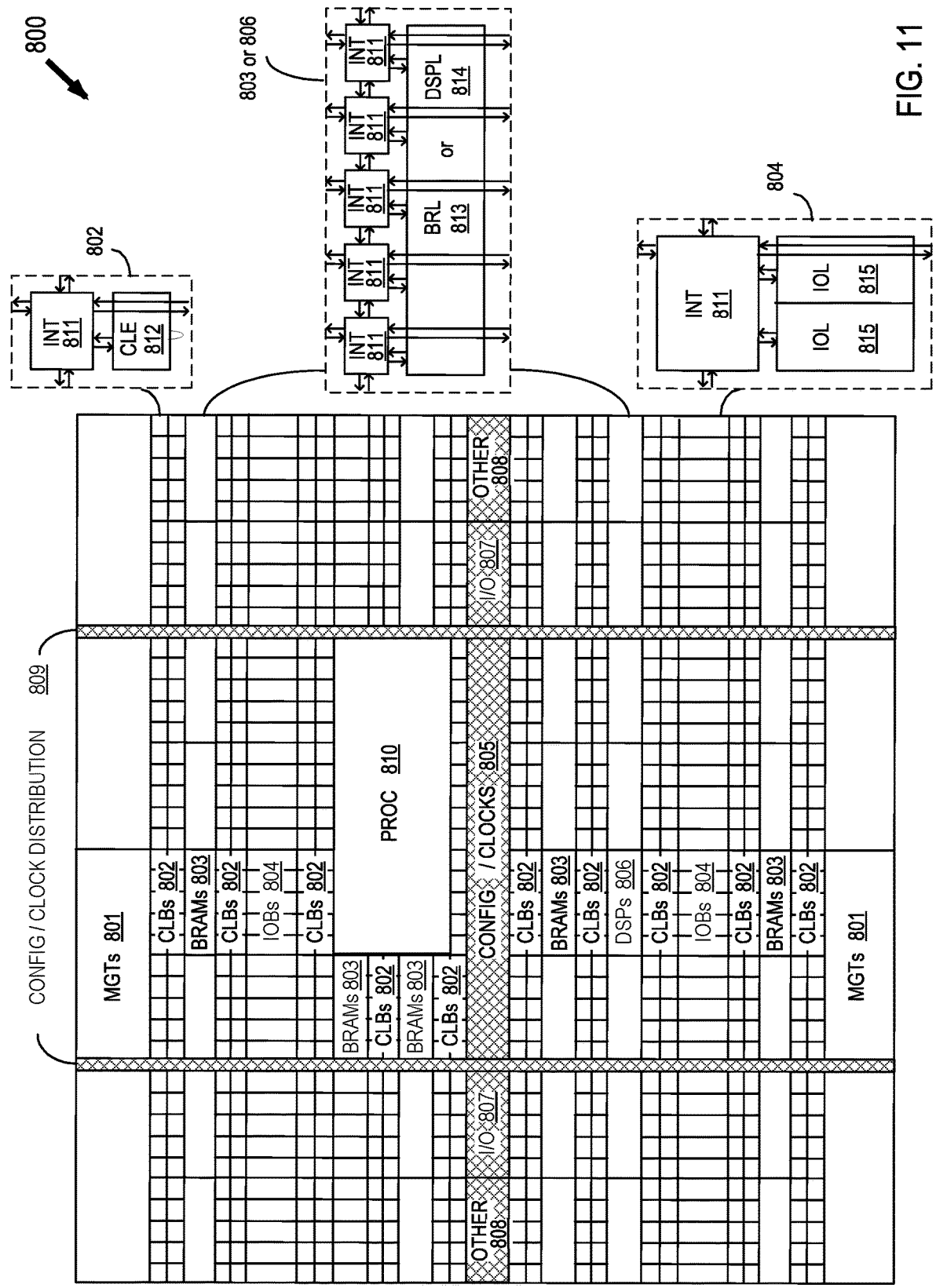
FIG. 11 shows a programmable integrated circuit on which a circuit can be implemented according the incremental synthesis approaches described herein.

FIG. 11 shows a programmable integrated circuit (IC) 800 on which a circuit can be implemented according the incremental synthesis approaches described herein. The programmable IC may also be referred to as a System On Chip (SOC) that includes field programmable gate array logic (FPGA) along with other programmable resources. FPGA logic may include several different types of programmable logic blocks in the array. For example, FIG. 8 illustrates programmable IC 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some programmable IC having FPGA logic also include dedicated processor blocks (PROC) 810 and internal and external reconfiguration ports (not shown).

In some FPGA logic, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA logic. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

A columnar area near the center of the die (shown shaded in FIG. 8) is used for configuration, clock, and other control logic. Horizontal areas 809 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 8 include additional logic blocks that disrupt the regular columnar structure making up a large part of the programmable IC. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual programmable IC, more than one adjacent column of CLBs is typically included wherever the CLBs appear, to facilitate the efficient implementation of user logic.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for incremental synthesis. Other aspects and features will be apparent to those skilled in the art from consideration of the specification. The methods and system may be implemented as one or more processors configured to execute software, as an application specific integrated circuit (ASIC), or as a logic on a programmable logic device.

It is intended that the specification and drawings be considered as examples only, with a true scope of the invention being indicated by the following claims.

What is claimed is:

1. A method comprising:
   partitioning a circuit design by a computer processor into a plurality of partitions during a first synthesis;
   generating a dependency graph of the circuit design in a memory by the computer processor during the first synthesis, the dependency graph having a plurality of vertices and edges that connect pairs of the vertices, each vertex representing a pin of a partition, and each edge representing an optimization applied from a pin in one of the partitions to a pin in another of the partitions;
   determining by the computer processor after a modification of the circuit design, changed partitions and unchanged partitions of the circuit design;
   determining dependent partitions of the changed partitions by the computer processor based on the dependency graph;
   re-synthesizing by the computer processor the changed partitions and the dependent partitions into respective re-synthesized partitions, the re-synthesizing including:
      optimizing the changed partitions and dependent partitions,
      removing from the dependency graph, edges connected to vertices representative of input pins and output pins of the changed partitions and edges connected to vertices representative of input pins and outputs pins of the dependent partitions, and
      adding to the dependency graph, a new edge for each optimization applied from a pin of the changed partitions or from a pin of the dependent partitions to a pin in another partition; and
   combining the respective re-synthesized partitions and the unchanged partitions into a complete synthesized circuit design in a memory by the computer processor.

2. The method of claim 1, further comprising:
   generating an initial netlist of the circuit design during the first synthesis;
   wherein the combining includes:
      determining from a module instance hierarchy, changed stitch points based on the changed partitions and dependent partitions; and
      replacing in the initial netlist, partitions that correspond to the changed partitions and dependent partitions with the re-synthesized partitions at the changed stitch points.

3. The method of claim 1, further comprising:
   generating an initial netlist of the circuit design during the first synthesis;
   wherein:
      the re-synthesizing includes generating an incremental netlist from the changed partitions and dependent partitions; and
      the combining includes:
         determining from a module instance hierarchy, unchanged stitch points based on the changed partitions and dependent partitions; and
         copying unchanged partitions from the initial netlist to the incremental netlist at the unchanged stitch points.

4. The method of claim 1, wherein a dependent partition is an unchanged partition of the plurality of partitions having a first pin connected to a second pin of a changed partition of the plurality of partitions, and an optimization applied during first synthesis affects the first and second pins.

5. The method of claim 1, further comprising:
generating configuration data that implements the circuit design; and
making an IC that implements the circuit design according to the configuration data.

6. The method of claim 1,
wherein each module of the circuit design spans one or more partitions of the plurality of partitions, and the dependency graph specifies optimization dependencies between partitions.

7. The method of claim 6, wherein the determining dependent partitions includes:
traversing the dependency graph in search of dependent partitions of changed partitions; and
determining from a netlist of each dependent partition for an input pin of the dependent partition, output pins of the dependent partition that are coupled to the input pin; and
determining from the netlist of each dependent partition for an output pin of the dependent partition, input pins of the dependent partition that are coupled to the output pin.

8. The method of claim 6, further comprising:
generating an initial netlist of the circuit design during the first synthesis;
wherein the combining includes:
determining from a module instance hierarchy, changed stitch points based on the changed partitions and dependent partitions; and
replacing in the initial netlist, partitions that correspond to the changed partitions and dependent partitions with the re-synthesized partitions at the changed stitch points.

9. A system comprising:
a computer processor;
a memory coupled to the computer processor and configured with instructions that when executed cause the computer processor to:
partition a circuit design into a plurality of partitions during a first synthesis;
generate a dependency graph of the circuit design in the memory during the first synthesis, the dependency graph having a plurality of vertices and edges that connect pairs of the vertices, each vertex representing a pin of a partition, and each edge representing an optimization applied from a pin in one of the partitions to a pin in another of the partitions;
determine after a modification of the circuit design, changed partitions and unchanged partitions of the circuit design;
determine dependent partitions of the changed partitions based on the dependency graph;
re-synthesize the changed partitions and the dependent partitions into respective re-synthesized partitions, including operations of:
optimizing the changed partitions and dependent partitions,
removing from the dependency graph, edges connected to vertices representative of input pins and output pins of the changed partitions and edges connected to vertices representative of input pins and outputs pins of the dependent partitions, and
adding to the dependency graph, a new edge for each optimization applied from a pin of the changed partitions or from a pin of the dependent partitions to a pin in another partition; and
combine the respective re-synthesized partitions and the unchanged partitions into a complete synthesized circuit design.

10. The system of claim 9, wherein:
the memory is further configured with instructions that when executed by the computer processor cause the computer processor to generate an initial netlist of the circuit design during the first synthesis;
the instructions for combining include instructions that cause the computer processor to:
determine from a module instance hierarchy, changed stitch points based on the changed partitions and dependent partitions; and
replace in the initial netlist, partitions that correspond to the changed partitions and dependent partitions with the re-synthesized partitions at the changed stitch points.

11. The system of claim 9, wherein:
the memory is further configured with instructions that when executed by the computer processor cause the computer processor to generate an initial netlist of the circuit design during the first synthesis;
the instructions for re-synthesizing include instructions that cause the computer processor to generate an incremental netlist from the changed partitions and dependent partitions; and
the instructions for combining include instructions that cause the computer processor to:
determine from a module instance hierarchy, unchanged stitch points based on the changed partitions and dependent partitions; and
copy unchanged partitions from the initial netlist to the incremental netlist at the unchanged stitch points.

12. The system of claim 9, wherein a dependent partition is an unchanged partition of the plurality of partitions having a first pin connected to a second pin of a changed partition of the plurality of partitions, and an optimization applied during first synthesis affects the first and second pins.

13. The system of claim 9, wherein
each module of the circuit design spans one or more partitions of the plurality of partitions, and the dependency graph specifies optimization dependencies between partitions.

14. The system of claim 13, wherein the instructions for determining the dependent partitions include instructions that when executed by the computer processor cause the computer processor to:
traverse the dependency graph in search of dependent partitions of changed partitions; and
determine from a netlist of each dependent partition for an input pin of the dependent partition, output pins of the dependent partition that are coupled to the input pin; and
determine from the netlist of each dependent partition for an output pin of the dependent partition, input pins of the dependent partition that are coupled to the output pin.

15. The system of claim 13, wherein:
the memory is further configured with instructions that when executed by the computer processor cause the computer processor to generate an initial netlist of the circuit design during the first synthesis;
the instructions for combining include instructions that cause the computer processor to:
determine from a module instance hierarchy, changed stitch points based on the changed partitions and dependent partitions; and replace in the initial netlist, partitions that correspond to the changed partitions and dependent partitions with the re-synthesized partitions at the changed stitch points.

16. The system of claim 9, the memory is further configured with instructions that when executed by the computer processor cause the computer processor to:

generate configuration data that implements the circuit design; and configure a programmable IC that implements the circuit design according to the configuration data.

17. A method comprising:

partitioning a circuit design by a computer processor into a plurality of partitions during a first synthesis;

generating a dependency graph of the circuit design in a memory by the computer processor during the first synthesis, the dependency graph having a plurality of vertices and edges that represent pin-to-pin optimization dependencies between pins in different ones of the partitions;

determining by the computer processor after a modification of the circuit design, changed partitions and unchanged partitions of the circuit design;

determining dependent partitions of the changed partitions by the computer processor based on the dependency graph;

re-synthesizing by the computer processor the changed partitions and the dependent partitions into respective re-synthesized partitions, the re-synthesizing including:

optimizing the changed partitions and dependent partitions, modifying the dependency graph based on the optimizing, by removing edges and adding edges to represent changed pin-to-pin optimization dependencies between pins in the different ones of the partitions; and combining the respective re-synthesized partitions and the unchanged partitions into a complete synthesized circuit design in a memory by the computer processor.

* * * * *